United States Patent [19]

Ogishima et al.

[11] Patent Number: 5,614,792
[45] Date of Patent: Mar. 25, 1997

[54] DYNAMIC FOCUS CIRCUIT AND DISPLAY DEVICE

[75] Inventors: Kiyoshi Ogishima, Kanagawa; Hiroyuki Ikegami, Chiba, both of Japan

[73] Assignee: Sony Corporation, Tokyo, Japan

[21] Appl. No.: 233,340

[22] Filed: Apr. 26, 1994

[30] Foreign Application Priority Data

May 8, 1993 [JP] Japan .................................. 5-131479

[51] Int. Cl.⁶ .................................................. H01J 29/58
[52] U.S. Cl. ........................................ 315/382.1; 348/806
[58] Field of Search ............................. 315/382, 382.1; 348/806

[56] References Cited

U.S. PATENT DOCUMENTS 5,162,705  11/1992  Golik ................................ 315/382

Primary Examiner—Theodore M. Blum
Attorney, Agent, or Firm—Jay H. Maioli

[57] ABSTRACT

A dynamic focus circuit used in a display device having a cathode ray tube and adapted for controlling convergence of an electron beam of the cathode ray tube. In the dynamic focus circuit, a horizontal deflection circuit generates a saw-tooth-wave current and a flyback transformer generates a high voltage for accelerating an electron beam. An orthogonal transformer receives a signal corresponding to the saw-tooth-wave current through a primary winding via the flyback transformer while receiving a control signal of a control circuit through a control winding and generates a dynamic focus voltage through a secondary winding. A capacitor supplies the dynamic focus voltage to a cathode ray tube. Thus, it is possible to produce a device of compact structure and to generate a satisfactory dynamic focus voltage.

5 Claims, 4 Drawing Sheets

DYNAMIC FOCUS CIRCUIT AND DISPLAY DEVICE

BACKGROUND OF THE INVENTION

This invention relates to a dynamic focus circuit for supplying a dynamic focus voltage to a display device having a cathode ray tube (CRT), and a display device having such a dynamic focus circuit.

A conventional display device having a CRT includes a dynamic focus circuit for supplying a dynamic focus voltage to the CRT. The dynamic focus voltage is superposed on a convergence voltage for dynamically changing the convergence voltage synchronously with deflection of an electron beam so that the electron beam is converged in peripheral portions of the CRT display surface.

The dynamic focus circuit for supplying such a dynamic focus voltage has an orthogonal transformer 101 and a dynamic focus transformer (DFT) 102, and is connected to a flyback transformer (FBT) 4, as shown in FIG. 1.

A primary winding of the flyback transformer 4 has its one end provided with a +B voltage through a power source terminal 1 and has its other end connected to a horizontal deflection circuit 3. The horizontal deflection circuit 3 has an NPN transistor 11, which has its collector terminal connected to the other end of the primary winding of the flyback transformer 4 and has its emitter terminal grounded. The horizontal deflection circuit 3 also includes a diode 12 and a capacitor 13, both of which have their respective one ends connected to the other end of the primary winding of the flyback transformer 4 and have their respective other ends grounded, in parallel to the transistor 11. The horizontal deflection circuit 3 is provided with a horizontal output synchronous with the horizontal frequency through an input terminal 2 as the base terminal of the transistor 11.

The horizontal deflection circuit 3 is also connected with a deflection coil or deflection yoke (DY) 5, which has its one end connected to the primary winding of the flyback transformer 4 and has its other end grounded through a capacitor 14, in parallel to the transistor 11.

A secondary winding of the flyback transistor 4 has its one end connected to a high voltage output terminal 9 through a diode 8 and has its other end grounded. The high voltage output terminal 9 is grounded through a capacitor 10. From this high voltage output terminal 9, a high voltage (HV) is output for application to the anode of the CRT to accelerate the electron beam.

The orthogonal transformer 101 includes a primary winding 103 and a secondary winding 104. The primary winding 103 of the orthogonal transformer 101 has its one end connected to an intermediate part of the secondary winding of the flyback transformer 4 and has its other end connected to one end of a primary winding 105 of the dynamic focus transformer 102. A secondary winding 104 of the orthogonal transformer 101 has its one end grounded and has its other end connected to a control circuit 18. The control circuit 18 controls an L value of the orthogonal transformer 101.

The other end of the primary winding 105 of the dynamic focus transformer 102 is grounded. A secondary winding 106 of the dynamic focus transformer 102 has its one end serving as an output terminal for a saw-tooth-wave current of a dynamic focus voltage and has its other end grounded. In FIG. 1, the capacitance of the CRT connected to one end of the secondary winding 106 of the the dynamic focus transformer 102 and a focus pack is expressed by a capacitor 7.

The output terminal for the saw-tooth-wave current is connected with a detection circuit 19. The detection circuit 19 detects the voltage value of the parabolic wave and provides the result of the detection to the control circuit 18.

In the dynamic focus circuit, on actuation of the horizontal deflection circuit 3, a collector pulse voltage synchronous with the horizontal frequency as shown in FIG. 2A is generated and a saw-tooth-wave current as shown in FIG. 2B is made to flow in the flyback transformer 4 and the deflection coil 5. The saw-tooth-wave current is supplied through the orthogonal transformer 101 to the dynamic focus transformer 102, where the saw-tooth-wave current is then integrated by the capacitance of the CRT and the focus pack so as to be a dynamic focus voltage consisting of a parabolic wave, as shown in FIG. 2C.

The control circuit 18 controls the L value of the orthogonal transformer 101 with reference to the detection result of the detection circuit 19, thus controlling the output waveform of the dynamic focus transformer 102.

The dynamic focus circuit as described above is capable of supplying a preferable dynamic focus voltage, and of enabling a display device adapted for so-called multi-scanning to carry out satisfactory image reproduction.

However, the dynamic focus circuit as described above has two transformers, that is, the orthogonal transformer 101 and the dynamic focus transformer 102. Therefore, it occupies a large area of substrate and is complicated to assemble and manufacture.

Also, the display device having such a dynamic focus circuit is difficult to reduce in size because the dynamic focus circuit included therein is difficult to reduce in size.

OBJECT AND SUMMARY OF THE INVENTION

Thus, in view of the above-described status of the art, it is an object of the present invention to provide a dynamic focus circuit which occupies a smaller area of substrate and is easier to assemble and manufacture. It is another object of the present invention to provide a display device which has a dynamic focus circuit of a smaller area occupying substrate and is capable of reduction in size.

According to the present invention, there is provided a dynamic focus circuit used in a display device having a cathode ray tube, and adapted for controlling convergence of an electron beam of the cathode ray tube, the dynamic focus circuit including: a deflection circuit having a deflection coil for deflecting the electron beam, the deflection circuit generating a saw-tooth-wave current; an orthogonal transformer having primary, secondary and control windings; a first unit for supplying the saw-tooth-wave current to the primary winding; a second unit for supplying a parabolic wave voltage generated from the secondary winding to the cathode ray tube; and a control unit for generating a control signal and supplying the control signal to the control winding, to control the level of the parabolic wave voltage.

In this dynamic focus circuit, the deflection circuit is a horizontal deflection circuit, and the first unit is a flyback transformer connected to the horizontal deflection circuit and having an intermediate part thereof connected to the primary winding of the orthogonal transformer.

Also, the first unit is a current transformer connected between the deflection coil and the primary winding of the orthogonal transformer.

Also, the control unit includes a detection circuit for detecting the parabolic wave voltage and a control circuit connected between the detection circuit and the control winding.

In addition, the control unit includes a current detection circuit for detecting the saw-tooth-wave current, and the control circuit compares an output of the detection circuit with an output of the current detection circuit.

According to the present invention, there is also provided a display device for deflecting an electron beam and radiating the deflected electron beam onto a screen to display an image signal, the display device including: a cathode ray tube including a deflection unit having a deflection coil for deflecting the electron beam and generating a saw-tooth-wave current, and a high voltage generating unit for generating a high voltage for accelerating the electron beam based upon the saw-tooth-wave current of the deflection unit; and a dynamic focus circuit including a dynamic focus voltage generating unit for generating a dynamic focus voltage for controlling convergence of the electron beam of the cathode ray tube in accordance with the saw-tooth-wave current of the deflection unit, a control unit for controlling an output voltage of the dynamic focus voltage generating unit, and a supply unit for supplying the output voltage of the dynamic focus voltage generating unit to the cathode ray tube.

In this display device, the dynamic focus voltage generating unit is an orthogonal transformer having a primary winding for receiving a signal corresponding to the saw-tooth-wave current, a control winding for receiving a control signal of the control unit, and a secondary winding for generating the dynamic focus voltage.

Also, the high voltage generating unit is a flyback transformer having a primary winding for receiving the saw-tooth-wave current of the deflection unit and a secondary winding for generating a high voltage for accelerating the electron beam.

Also, the control unit includes a detection circuit for detecting the dynamic focus voltage and a control circuit for controlling the output voltage of the dynamic focus voltage unit in accordance with a detection output of the detection circuit.

In addition, the control circuit includes a current detection circuit for detecting the saw-tooth-wave current, and the control circuit compares an output of the detection circuit with an output of the current detection circuit.

In the dynamic focus circuit according to the present invention, the orthogonal transformer, having the primary, secondary and control windings for outputting the parabolic wave voltage as the dynamic focus voltage from the secondary winding formed of the pulse wave entered to the primary winding, has its parabolic wave voltage controlled by the control circuit connected to the control winding. Therefore, the dynamic focus circuit can provide a preferable dynamic focus voltage.

Also, in the above-described dynamic focus circuit, if the detection circuit for detecting the voltage value of the parabolic wave voltage output from the secondary winding of the orthogonal transformer is provided for controlling the parabolic wave voltage with reference to the voltage value detected by the detection circuit, the dynamic focus voltage can be easily controlled to be maintained at a constant level or to correspond to the screen size.

In addition, in the above-described dynamic focus circuit, the current transformer is provided, having its primary winding connected to the deflection coil connected to the horizontal deflection circuit and having a current of a value proportionate to the current value of the deflection current to flow through the secondary winding thereof, and the deflection current detection circuit for detecting the value of current flowing through the secondary winding of the current transformer is provided. In cases where the control circuit controls the parabolic wave voltage employing the current value detected by the deflection current detection circuit as the reference value, the current flowing through the secondary winding of the current transformer is of a value corresponding to the screen size, thus producing the dynamic focus voltage corresponding to the screen size. Thus, the control range of the orthogonal transformer may be reduced and a transformer of a smaller size can be employed.

In the display device according to the present invention, the dynamic focus voltage generating unit having its output controlled by the control unit generates a dynamic focus voltage for controlling convergence of the electron beam of the cathode ray tube, in accordance with the saw-tooth-wave current of the deflection unit of the cathode ray tube, and the supply unit supplies the dynamic focus voltage to the cathode ray tube. Thus, the device can be made compact.

BRIEF DESCRIPTION OF THE DRAWINGS

FIG. 2A shows a collector pulse voltage synchronous with the horizontal frequency. FIG. 2B shows a saw-tooth-wave current. FIG. 2C shows a dynamic focus voltage as a parabolic wave.

DESCRIPTION OF PREFERRED EMBODIMENTS

Preferred embodiments of the present invention will now be described with reference to the accompanying drawings.

A dynamic focus circuit according to the present invention is a circuit to be employed in a display device having a cathode ray tube (CRT) for providing a dynamic focus voltage to the CRT. Also, the display device according to the present invention is provided with the dynamic focus circuit of the present invention and other units, such as a CRT.

The dynamic focus voltage is superposed on a convergence voltage for dynamically changing the convergence voltage synchronously with deflection of an electron beam so that the electron beam is converged in peripheral portions of the CRT display surface.

Figure 3:
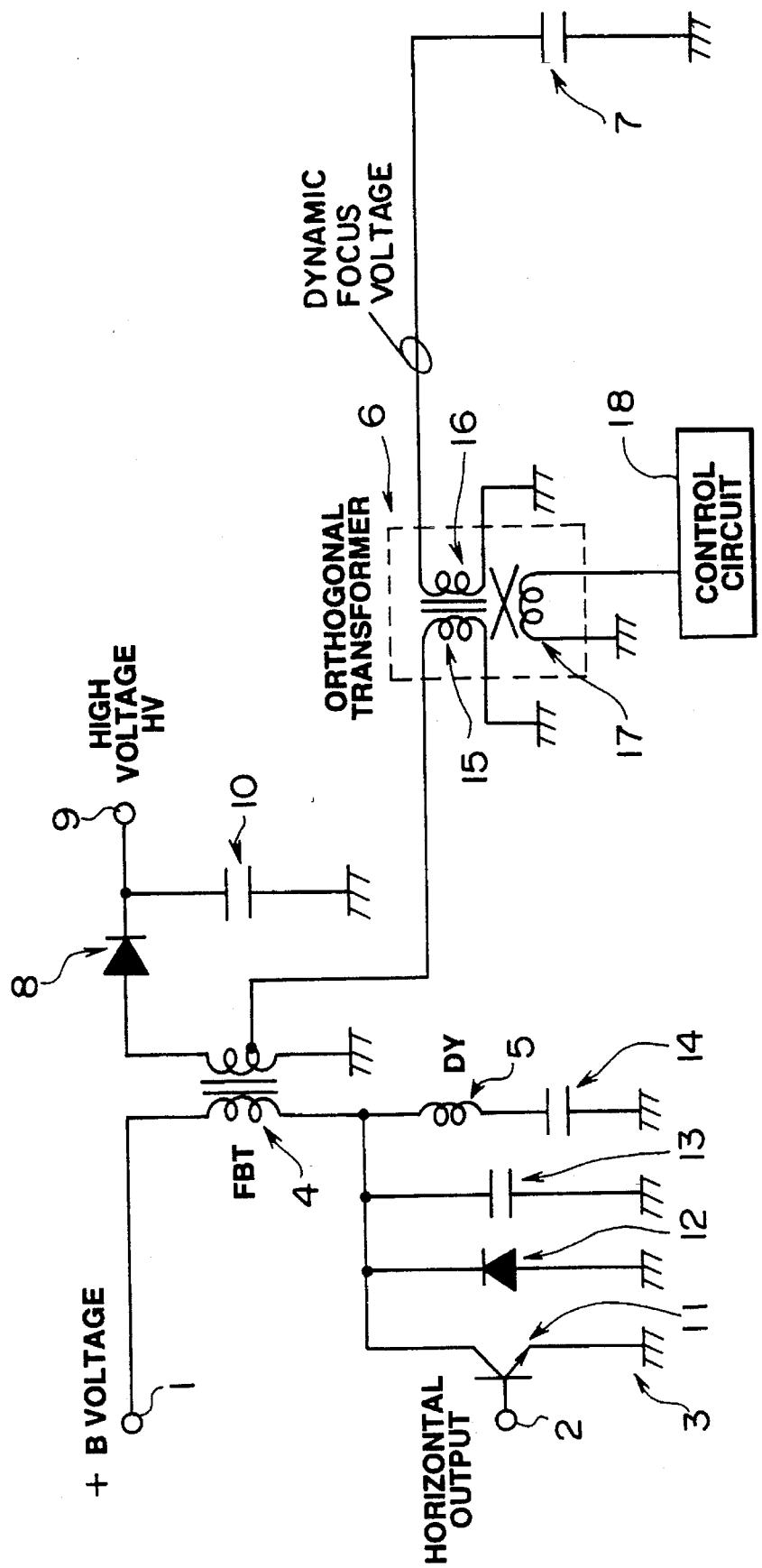
FIG. 3 is a circuit diagram showing the structure of a dynamic focus circuit according to the present invention.
Figure 4:
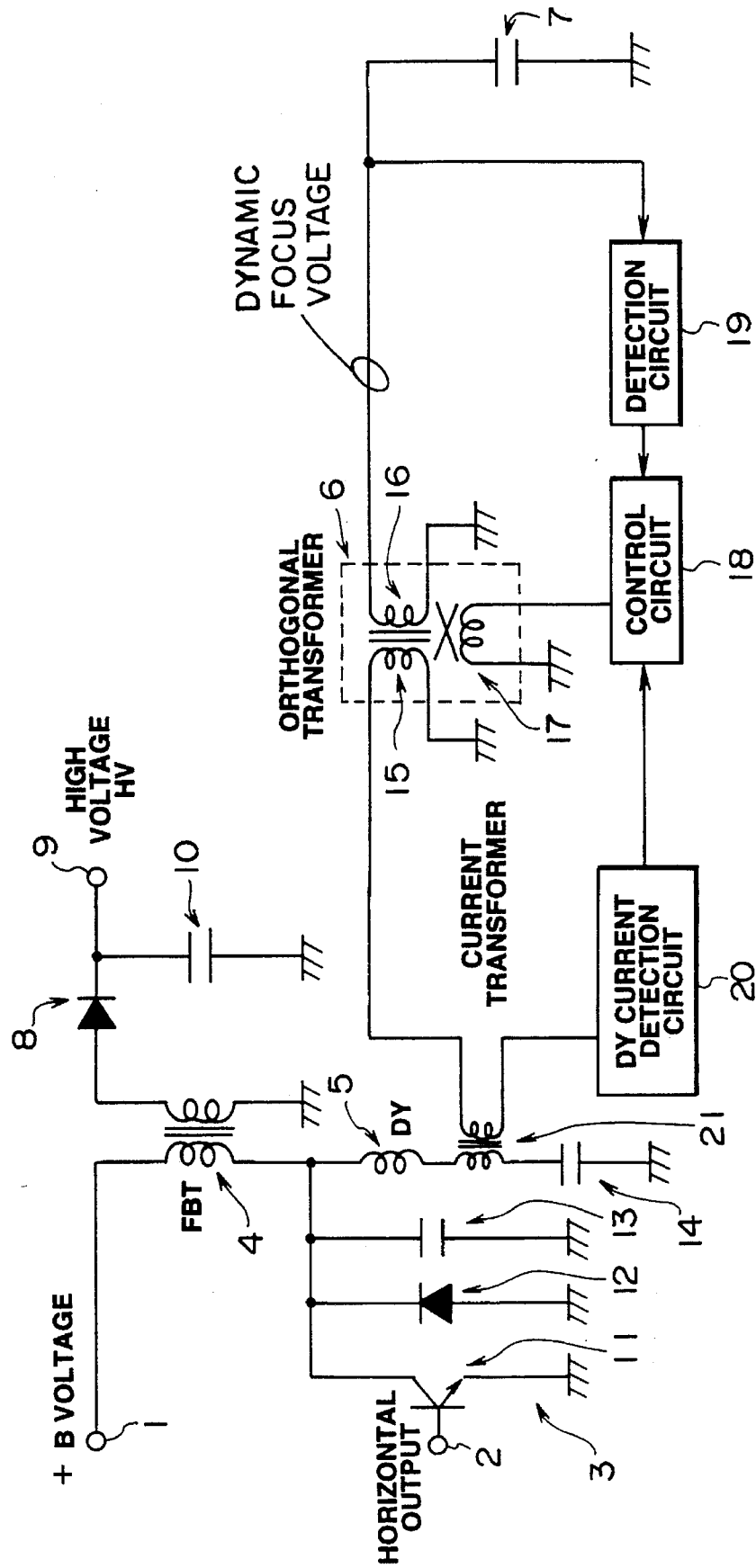
FIG. 4 is a circuit diagram showing another example of the structure of the dynamic focus circuit.

The dynamic focus circuit has an orthogonal transformer 6, as shown in FIG. 3. The orthogonal transformer 6 has a primary winding 15, a secondary winding 16, and a control winding 17 which is orthogonal to the primary and secondary windings 15, 16. In the orthogonal transformer 6, the primary and secondary windings 15, 16 form a dynamic focus transformer, in which a saw-tooth-wave current produced by amplifying a saw-tooth-wave current provided to the primary winding 15 is made to flow through the secondary winding 16. The control winding 17, if supplied with a control current, controls a magnetic flux generated between the primary and secondary windings 15, 16, to control the output from the secondary winding 16.

The orthogonal transformer 6 may have an arrangement in which the ratio of the numbers of windings is (the number of windings of the primary winding):(the number of windings of the secondary winding):(the number of windings of the control winding)=15:900:1200. In that case, if the control winding 17 is actuated by a power source of 12 V while a current of 140 mAp-p flows through the primary winding 15, the current flowing through the secondary winding 16 can be variably controlled within a range from 4 mAp-p to 10 mAp-p.

The primary winding 15 of the orthogonal transformer 6 has its one end connected to an intermediate portion of a secondary winding of a flyback transformer 4 constituting the display device, and has its other end grounded.

A primary winding of the flyback transformer 4 has its one end provided with a +B voltage through a power source terminal 1, and has its other end connected with a horizontal deflection circuit 3. The horizontal deflection circuit 3 is provided with an NPN transistor 11 having its collector terminal connected to the other end of the primary winding of the flyback transformer 4 and having its emitter terminal grounded. The horizontal deflection circuit 3 is also provided with a diode 12 having its cathode connected to the other end of the primary winding of the flyback transistor 4 and having its anode grounded. Also, the horizontal deflection circuit 3 is provided with a capacitor 13 having its one terminal connected to the other end of the primary winding of the flyback transistor 4 and having its other end grounded. The horizontal deflection circuit 3 of such a structure is supplied with a horizontal output synchronous with the horizontal frequency through an input terminal 2 as the base terminal of the transistor 11.

The horizontal deflection circuit 3 is connected with a deflection coil or deflection yoke (DY) having its one end connected to the primary winding of the flyback transformer 4 and having its other end grounded through a capacitor 14.

A secondary winding of the flyback transformer 4 has its one end connected to the anode of a diode 8 and has its other end grounded. The cathode of the diode 8 is connected to a high voltage output terminal 9. The high voltage output terminal 9 is grounded through a capacitor 10. A high voltage (HV) to be applied to the anode of the CRT for accelerating the electron beam is output from the high voltage output terminal 9.

The secondary winding 16 of the orthogonal transformer 6 has its one end employed as an output terminal of a parabolic wave voltage as a dynamic focus voltage, and has its other end grounded. In FIG. 3, the capacitance of the CRT connected to the one end of the secondary winding 16 of the orthogonal transformer 6 and the focus pack is expressed by a capacitor 7. The control winding 17 of the orthogonal transformer 6 has its one end grounded and has its other end connected with a control circuit 18. The control circuit 18 supplies to the control winding 17 a control current for controlling the magnetic flux generated between the primary and secondary windings 15, 16.

Figure 1:
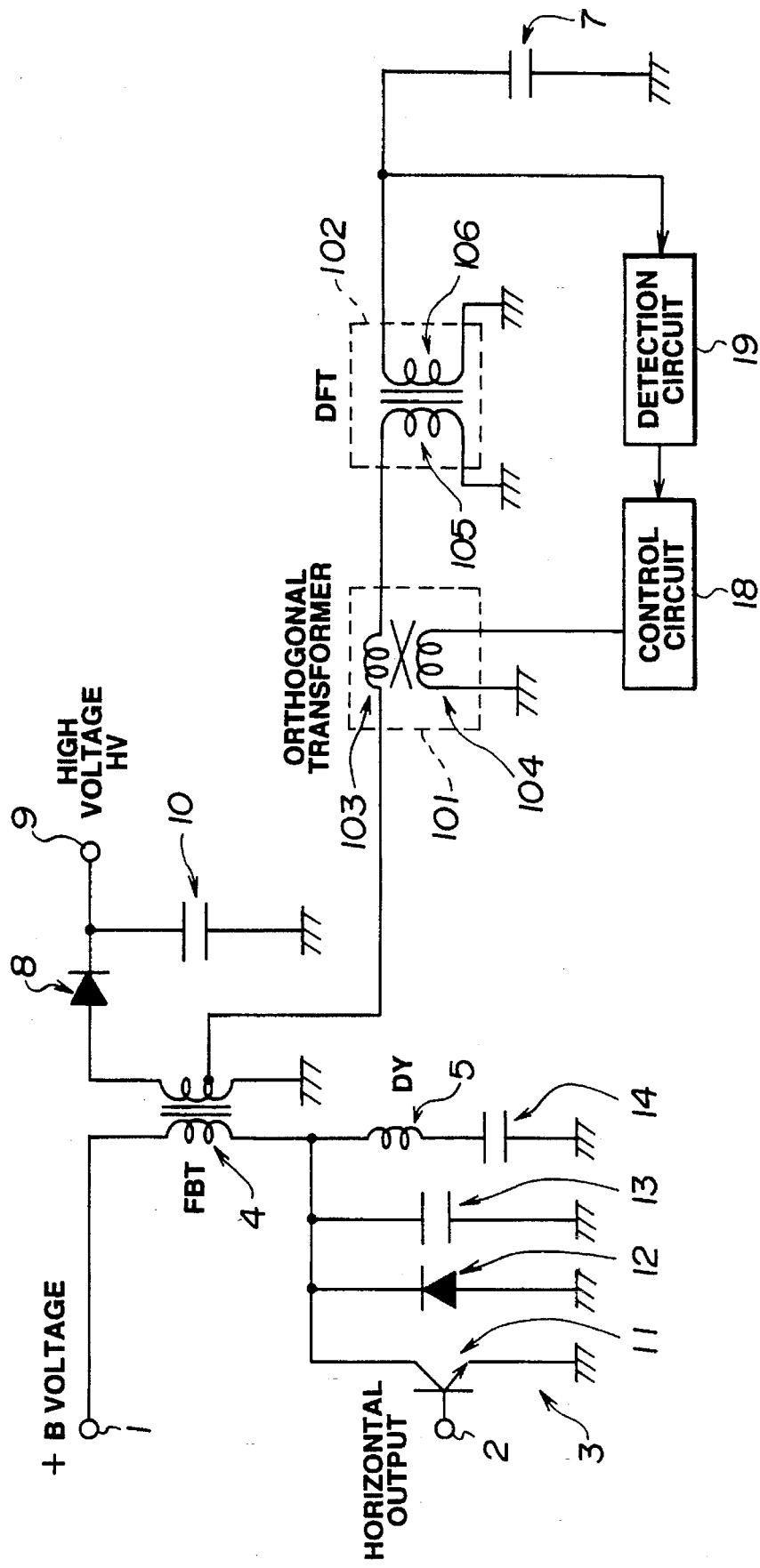
FIG. 1 shows a circuit diagram showing the structure of a conventional dynamic focus circuit.
Figure 2A:
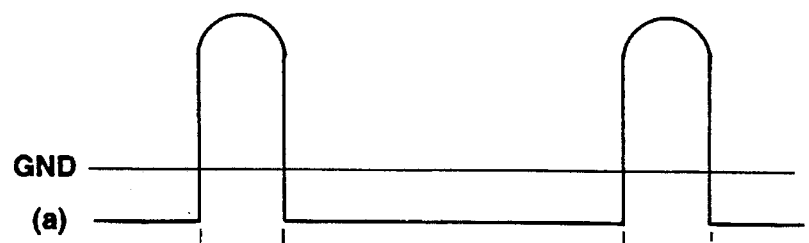
FIGS. 2A through C show waveforms of voltages at several positions in a dynamic focus circuit.
Figure 2B:
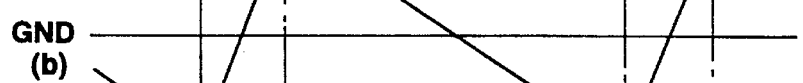
Figure 2C:
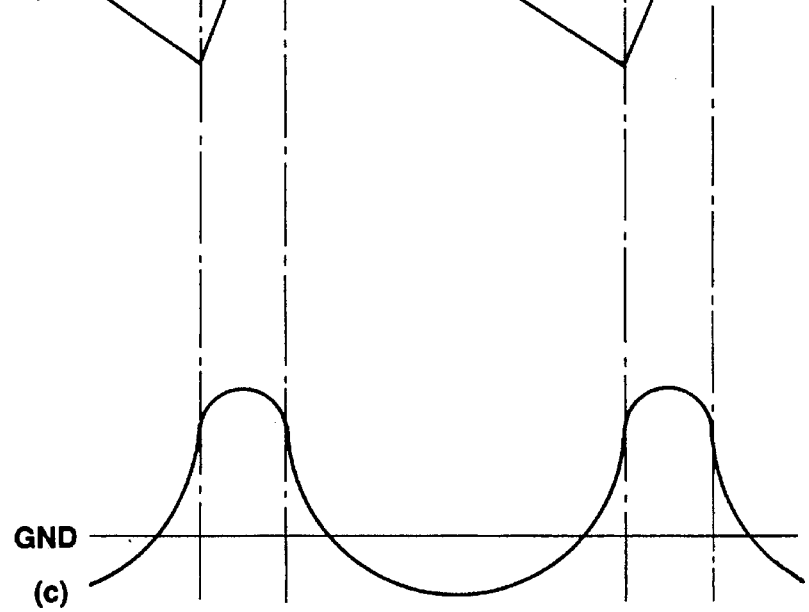

In the dynamic focus circuit of such a structure, on actuation of the horizontal deflection circuit 3, a collector pulse voltage synchronous with the horizontal frequency as shown in FIG. 2A is generated and a saw-tooth-wave current as shown in FIG. 2B is made to flow through the flyback transformer 4 and the deflection coil 5. As the saw-tooth-wave current is supplied to the primary winding 15 of the orthogonal transformer 6, a saw-tooth-wave current is made to flow through the secondary winding 16 of the orthogonal transformer 6. The saw-tooth-wave current is integrated by the capacitor 7 of the CRT and the focus pack, so as to form a dynamic focus voltage, as shown in FIG. 2C.

The control circuit 18 controls the magnetic flux generated between the primary and secondary windings 15, 16 through the control winding 17, thus controlling the output waveform from the orthogonal transformer 6. Under this control, the dynamic focus voltage is controlled to be maintained at a constant level or to correspond to the screen size of the CRT. The control circuit 18 is supplied with an information signal required for such control.

According to the present invention, the above-described dynamic focus circuit and the display device may be provided additionally with a detection circuit 19 for detecting the voltage value of the parabolic wave voltage and a deflection current or DY current detection circuit 20 for detecting the current value of the deflection current flowing through the deflection coil 5.

The detection circuit 19 detects the voltage value of the parabolic wave voltage, and supplies the detection result to the control circuit 18. The control circuit 18 is capable of controlling the dynamic focus voltage to be maintained at a constant level, referring to the detection result of the detection circuit 19.

A current transformer 21 has its primary winding connected in series between the deflection coil 5 and the capacitor 14. Accordingly, a current of a value proportionate to the current value of the deflection current flowing through the deflection coil 5 is made to flow through a secondary winding of the current transformer 21. The current flowing through the secondary winding of the current transformer 21 is of the collector pulse, similar to the current flowing through the secondary winding of the flyback transformer 4 and the deflection coil 5, as shown in FIG. 2A. In the present dynamic focus circuit, the primary winding 15 of the orthogonal transformer 6 has its one end connected to the one end of the secondary winding of the current transformer 21 and has its other end grounded.

The deflection current detection circuit 20 is connected to the other end of the secondary winding of the current transformer 21, for detecting the current value of the current flowing through the secondary winding. The deflection current detection circuit 20 supplies the detection result to the control circuit 18.

The control circuit 18 is capable of controlling the parabolic wave voltage output from the orthogonal transformer 6, using as the reference value the current value of the current flowing through the secondary winding of the current transformer 21 detected by the deflection current detection circuit 20.

The current flowing through the secondary winding of the current transformer 21 is made to correspond to the screen size of the CRT, similar to the deflection current flowing through the deflection coil 5. Accordingly, if the current from the secondary winding of the current transformer 21 is supplied to the primary winding 15 of the orthogonal transformer 6, the dynamic focus voltage is made to preferably correspond to the screen size of the CRT even though the control range of the orthogonal transformer 6 by the control circuit 18 is narrowed.

The current transformer 21 may have an arrangement in which the ratio of the numbers of windings is (the number of windings of the primary winding):(the number of windings of the secondary winding)=1:50. In this case, if a current of 12 Ap-p is caused to flow through the primary winding of the current transformer 21, a current of 40 mAp-p is made to flow through the secondary winding.

What is claimed is:

1. A dynamic focus circuit used in a display device having a cathode ray tube, and adapted for controlling a focus condition of an electron beam of the cathode ray tube, the dynamic focus circuit comprising:

a deflection circuit having a deflection coil for deflecting the electron beam, the deflection circuit generating a saw-tooth-wave current;

an orthogonal transformer having a primary winding, a secondary winding and a control winding orthogonal to the primary winding and secondary winding and for controlling magnetic flux between the primary winding and the secondary winding, wherein a transforming level of the orthogonal transformer is modulated by a control signal applied to the control winding;

first means for supplying a saw-tooth-wave current to the primary winding;

second means for supplying a parabolic wave voltage generated from the secondary winding to the cathode ray tube; and control means independent of and disconnected from said second means for supplying the parabolic wave voltage and from the primary winding and the secondary winding for generating said control signal of a constant voltage control signal and supplying the constant voltage control signal to the control winding to control the level of the parabolic wave voltage amplitude.

2. The dynamic focus circuit as claimed in claim 1, further comprising a horizontal deflection circuit as the deflection circuit and a flyback transformer as the first means, the flyback transformer being connected to the horizontal deflection circuit and having an intermediate part thereof connected to the primary winding of the orthogonal transformer.

3. The dynamic focus circuit as claimed in claim 1, further comprising a current transformer as the first means, the current transformer being connected between the deflection coil and the primary winding of the orthogonal transformer.

4. A display device for deflecting an electron beam and for radiating the deflected electron beam onto a screen to display an image signal, the display device comprising:

a cathode ray tube including deflection means having a deflection coil for deflecting an electron beam and generating a saw-tooth-wave current;

high voltage generating means for generating a high voltage for accelerating the electron beam based upon the saw-tooth-wave current of the deflection means;

a dynamic focus circuit including dynamic focus voltage generating means having a primary winding for receiving a signal corresponding to the saw-tooth-wave current, a control winding for receiving a control signal, and a secondary winding for generating a dynamic focus voltage for controlling a focus condition of the electron beam of the cathode ray tube in accordance with the saw-tooth-wave current of the deflection means;

control means for controlling an output voltage of the dynamic focus voltage of the dynamic focus voltage generating means, wherein said control means includes a focus voltage detection circuit for detecting the dynamic focus voltage and a control circuit for controlling the output voltage of the dynamic focus voltage generating means, and a current detection circuit for detecting the saw-tooth-wave current, and wherein the control circuit compares an output of the focus voltage detection circuit with an output of the current detection circuit for providing the control signal fed to said control winding of said orthogonal transformer; and supply means for supplying the output voltage of the dynamic focus voltage generating means to the cathode ray tube.

5. The display as claimed in claim 4, further comprising a flyback transformer as the high voltage generating means, the flyback transformer having a primary winding for receiving the saw-tooth-wave current of the deflection means and a secondary winding for generating a high voltage for accelerating the electron beam.

* * * * *

UNITED STATES PATENT AND TRADEMARK OFFICE
CERTIFICATE OF CORRECTION

PATENT NO. : 5,614,792
DATED : March 25, 1997
INVENTOR(S) : Kiyoshi Ogishima and Hiroyuki Ikegami It is certified that error appears in the above-identified patent and that said Letters Patent is hereby corrected as shown below:

Col.8, line 31, after "display" insert --device--

Signed and Sealed this

Third Day of February, 1998

BRUCE LEHMAN

*Attest:*

*Attesting Officer*  *Commissioner of Patents and Trademarks*